United States Patent [19]

Adiletta

[11] Patent Number: 4,508,775

[45] Date of Patent: Apr. 2, 1985

[54] GAS PERMEABLE COMPOSITE STRUCTURES

[75] Inventor: Joseph G. Adiletta, Thompson, Conn.

[73] Assignee: Pall Corporation, Glen Cove, N.Y.

[21] Appl. No.: 566,404

[22] Filed: Dec. 28, 1983

Related U.S. Application Data

[63] Continuation-in-part of Ser. No. 542,026, Oct. 14, 1983, abandoned.

[51] Int. Cl.³ ............................................. B32B 5/16
[52] U.S. Cl. ............................... 428/240; 5/483; 55/16; 55/158; 162/156; 428/248; 428/252; 428/264; 428/265; 428/267; 428/283; 428/288; 428/297; 428/298; 428/408; 428/421; 428/422; 428/903; 428/913; 428/920; 428/406
[58] Field of Search ............... 428/252, 240, 283, 288, 428/297, 902, 903, 408, 248, 264, 265, 913, 920, 267, 406, 421, 422, 298; 162/156; 55/16, 158; 5/483

[56] References Cited

U.S. PATENT DOCUMENTS

| | | | |
|---|---|---|---|
| T100,902 | 8/1981 | Hauser | 428/903 |
| 2,778,763 | 1/1957 | Novak | 428/903 |
| 2,803,615 | 8/1957 | Ahlbrecht et al. | |
| 3,016,599 | 1/1962 | Perry | 428/903 |
| 3,489,148 | 1/1970 | Duncan et al. | |
| 3,573,158 | 3/1971 | Pall et al. | 162/156 |
| 3,575,899 | 4/1971 | Pryor et al. | |
| 3,702,279 | 11/1972 | Ardary et al. | 428/903 |
| 3,746,679 | 7/1973 | Seipel | |
| 3,788,935 | 1/1974 | Shyne et al. | 428/903 |
| 3,824,126 | 7/1974 | Katsushima et al. | |
| 3,950,588 | 4/1976 | McDougal | |
| 4,058,647 | 11/1977 | Inoue et al. | |
| 4,097,297 | 6/1978 | Keene | |
| 4,135,029 | 1/1979 | Pfeffer | |
| 4,321,404 | 3/1982 | Williams et al. | |
| 4,426,470 | 1/1984 | Wessling et al. | 162/156 |

OTHER PUBLICATIONS

"Vinyl Acetate/Ethylene Emulsion Copolymers", from *Paint Manufacture*, Sep. 1968.

*Primary Examiner*—James J. Bell
*Attorney, Agent, or Firm*—Leydig, Voit, Osann, Mayer and Holt, Ltd.

[57] ABSTRACT

Flexible, microporous, hydrophobic and oleophobic film-like composite structures comprised of from about 25 to about 75 parts by weight of inorganic reinforcing microfibers, particularly glass, and from about 75 to about 25 parts by weight of a polymeric binding agent, preferably a copolymer of ethylene and vinyl acetate, the polymeric binding agent being in the form of a continuous matrix and derived from an emulsion or latex of the binding agent in which the particles of the binding agent are less than about 1 micrometer in size. A treating agent, preferably a fluorinated hydrocarbon, is present in an amount sufficient to render the composite structure hydrophobic and oleophobic.

20 Claims, No Drawings

GAS PERMEABLE COMPOSITE STRUCTURES

This application is a continuation-in-part of my copending application Ser. No. 542,026 filed Oct. 14, 1983 now abandoned.

TECHNICAL FIELD

This invention relates to gas permeable composite structures and articles produced therefrom suitable for use as protective clothing, fabrics, filters and the like. More particularly, this invention relates to flexible, microporous, hydrophobic, oleophobic, inorganic microfiber reinforced structures useful for such applications.

BACKGROUND ART

There are a variety of applications where a flexible, gas permeable material which is also hydrophobic and oleophobic is useful. For example, in the clean up of chemical waste sites, a prevalent problem in our country today, there is a need for protective clothing which (1) will resist passage of both oil and water-based compositions and (2) is gas permeable, allowing passage of air and water vapor, thereby permitting transmission of air and moisture (perspiration) through the material from the body side to the atmosphere. In this type of application, detergent and solvent resistant characteristics are also valuable since the nature of the compositions encountered is not always known. Similarly, the need for protective clothing and shelter for military personnel who, in the field, may be exposed to deleterious oil and water-based aerosols by virtue of field conditions, provides additional incentive for the development of light-weight, flexible or pliant, microporous (thereby being gas permeable) hydrophobic, oleophobic structures which can be tailored to form protective fabric used to form field shelters, e.g., tents, and used in vehicle protection and the like.

The subject invention is directed to composite structures which provide the desired properties in such applications.

DISCLOSURE OF THE INVENTION

The subject invention provides a flexible, microporous, hydrophobic and oleophobic, reinforced composite film-like structure comprising: (1) from about 25 to about 75 parts by weight of inorganic reinforcing microfibers and (2) from about 75 to about 25 parts by weight of a polymeric binding agent in the form of a continuous matrix and which is derived from an emulsion or latex of the binding agent in which the particles of the polymeric binding agent are less than about 1 micrometer in size, the binding agent and microfibers being present in the composite structure in a total amount of 100 parts by weight, based on the weight of the matrix material and the microfibers. A hydrophobic, oleophobic treating agent is also present in an amount sufficient to render the composite structure both hydrophobic and oleophobic. The composite structure is microporous with pore sizes of about 30 micrometers or smaller, preferably 10 micrometers or smaller, and most preferably on the order of about 2 micrometers, albeit for some applications pore sizes as fine as 0.1 micrometer may be desirable. The structures have porosities of from about 0.01 to about 100, preferably from about 0.1 to 20, cubic feet of air per square foot of surface area per minute at a pressure of 0.5 inches WC and a temperature of 20 degrees Centigrade.

Various combinations of the composite structure of this invention with various other materials are also contemplated. For example, a preferred combination comprises, in order, (1) an outer layer of cloth secured to one side of (2) an intermediate layer of the composite structure of this invention with the other side of this intermediate layer secured to (3) one side of a charcoal liner and the other side of the charcoal liner secured to (4) an inner liner fabric or another layer of the composite structure of this invention.

BEST MODE FOR CARRYING OUT THE INVENTION

The composite structure of the present invention is comprised of a mixture of inorganic reinforcing microfibers and a polymeric binding agent in the form of a continuous matrix of the binding agent reinforced by the inorganic microfibers, the resulting structure being both porous and flexible or pliant. The composite structure has film-like characteristics in that it is a continuous matrix of the binding agent in the form of a thin, porous membrane in which the inorganic microfibers are embedded. This contrasts with conventional inorganic fiber mats in which a binder resin is used to cement the fibers at crossover points. This distinction, coupled with the use of an emulsion or latex containing binder resin particles of less than about 1 micrometer in size, preferably less than about 0.3 micrometer, gives the composite structures of this invention their desirable properties.

For certain applications, such as when used as a coating on a shell or outer fabric and used as protective clothing, the material preferably has cloth-like characteristics in that it is not only flexible or pliant, it has draping characteristics similar to that of the cloth, i.e., it will hang in loose folds. The reinforcing inorganic microfibers are present in the film-like composite structure in an amount in the range of from about 25 to about 75 parts by weight, preferably from about 40 to about 70 parts by weight, most preferably about 60 to 67 parts by weight, and the binding agent is present in an amount of from about 75 to about 25 parts by weight, preferably from about 60 to about 30 parts by weight, most preferably about 40 to about 33 parts by weight (the binding agent and the inorganic microfibers being present in the composite structure in a total amount of 100 parts by weight based on the weight of the binding agent and the microfibers).

The inorganic microfibers used are in the form of microfibrous staple fibers. Glass microfibers used in this invention have an average length in the range of from about 50 to about 3,000 micrometers and diameters in the range of from about 0.4 to about 4.0 micrometers, preferably in the range of from about 0.5 to about 2.0 micrometers, more preferably in the range of from about 0.4 to about 1.2 micrometers. The aspect ratios of the glass fibers will generally lie in the range of from about 20:1 to about 1,000:1, preferably being on the order of about 100:1. Glass microfibers of this type are available from Johns Manville Corporation in various grades, e.g., grade 106 is a nominal 0.6 micrometer in diameter size with a 0.54–0.68 micrometer range, grade 104 is a nominal 0.45 micrometer size with a 0.40–0.55 micrometer range, grade 108A is a nominal 0.9 micrometer with a 0.69–1.1 micrometer range and grade 112 is a nominal 3 micrometer size with a 2.6–3.8 micrometer range. Blends of different grades can also be used to provide different distribution of sizes than any one grade provides.

Other inorganic microfibers, such as metal, alumina or potassium titanate, may also be used but are less preferred. Mixtures of inorganic microfibers, such as glass and potassium titanate, may also be used. Such mixtures are desirable in applications where a lower permeability is desirable since the potassium titanate fibers are generally finer than the glass fibers. The potassium titanate fibers typically have diameters in the range of from about 0.1 to about 0.5 micrometer with a preferred aspect ratio of about 50:1. Preferably, the lengths of these fibers are in the range of from about 5 to about 25 micrometers. A preferred mixture is about 80 percent by weight glass microfibers and about 20 percent by weight potassium titanate.

The binding agent, to be suitable for use in the subject invention, must have the following characteristics. It must (a) hold or bind the microfibers in place, that is, provide structural integrity for the thermal insulation portion of the subject invention and (b) when combined with the microfibers, form a structure which is porous as well as pliant or flexible, allowing the composite structure to be used in applications such as clothing where bending or flexing in operation is important and where breathability is required. To provide the requisite porosity necessary for the structure to be gas permeable, providing for transmission of air and water vapor (perspiration) through the structure from the body side to the atmosphere, the binder, as mixed with the microfibers to form a slurry or dispersion prior to formation of the fibrous sheet, as described hereinafter, must be in particulate form (preferably in the form of an emulsion or latex), wherein the binder particles are less than about 1 micrometer in size, preferably less than about 0.5 micrometer. The binding agent should, for many applications, be flame resistant as well as stable at temperatures encountered in the field, e.g., temperatures ranging from sub-freezing through ambient conditions and as high as 120 degrees F.

A preferred binder (particularly when fire resistance is desirable) is a heteropolymer formed from vinyl chloride monomer and ethylene, most preferably an ethylene-vinyl chloride acrylamide terpolymer. Materials of this type are available from Air Products and Chemicals, Inc. under the trademark AIR-FLEX ®. Particularly preferred is AIRFLEX ®4500, an ethylene-vinyl chloride terpolymer with amide functionalities in the form of an emulsion. The solids content of this emulsion is at least about 50 weight percent and the average particle size is about 0.12 micrometer.

Other preferred binders, particularly for use in preparing composite structures for clothing—where a high level of temperature or fire resistance is not critical—are ethylene vinyl acetate emulsion copolymers. These materials are described in some detail in the article in the September 1968 edition of *Paint Manufacture* titled "Vinyl Acetate/Ethylene Emulsion Copolyers". A preferred copolymer of this type is 100HS/EVA available from Air Products and Chemicals, Inc. It is an ethylene vinyl acetate emulsion copolymer having average particle sizes of less than 1 micrometer and a low curing temperature.

The composite structure of this invention is preferably formed by the following general process.

The fibers are mixed with water to form a dispersion or slurry at ambient conditions. (When glass microfibers are used, the pH of the water prior to addition of the microfibers is adjusted to an acidic pH, preferably of about 5, although pH's in the range of from about 3 to about 11 may be used.)

After agitation to form a slurry or dispersion of the fibers, the binding agent, as an emulsion or latex, is added. The resulting mixture, having (a) a solids content of from about 0.5 to about 20 weight percent, preferably from about 0.5 to about 10 weight percent, more preferably about 2 weight percent and (b) a viscosity in the range of from about 1 to about 100 centipoise, at ambient conditions, preferably less than about 30, is then mixed for an extended time, preferably for from about 20 to about 60 minutes, to provide a uniform slurry. The slurry is then formed into sheet-like material by casting or spreading the dispersion onto a foraminous structure and removing water. Any suitable apparatus, most appropriately of the type used in paper forming processes, such as a headbox, may be used to cast or spread the dispersion of fibers and polymeric binding agent. After removal of water, typically by draining followed by the application of a vacuum, the formed structure is dried and the binding agent cured. In an alternative embodiment, the composite structure of this invention may be formed by casting the slurry directly onto a layer of cloth or the like which may be used as part of the structure, e.g., a heavy cotton fabric or onto a reinforcing scrim cloth comprised of, e.g., woven glass filaments.

A preferred method for preparing the composite structure of this invention with the preferred fibers, i.e., glass microfibers, comprises the following steps:

(1) About 1,000 parts of water are placed in a tank and the pH of the water is adjusted to about 5 with an organic or an inorganic acid, e.g., sulfuric acid.

(2) A blend of (a) glass microfibers having diameters between about 0.1 and 1.2 micrometers and aspect ratios on the order of 100:1 and (b) potassium titanate fibers having diameters of about 0.1 to 0.5 micrometer and aspect ratios on the order of about 50:1, in a weight ratio of glass fibers to potassium titanate fibers of about 4 to 1 are dispersed in the tank of water in an amount such that about 1 part of the inorganic microfibers is present to about 1,000 parts by weight of water. The inorganic microfibers are dispersed in the water with agitation at ambient conditions.

(3) To this dispersion is added the binder agent in the form of a water-based emulsion containing 15 percent by weight of solids of the binder resin. The binder resin emulsion is added in an amount such that the solids content of the emulsion, i.e., the weight of the binding agent, is present in an amount of about 1 part by weight solids to 2 parts by weight of the inorganic microfibers present, that is, the ratio of the binder resin solids to the inorganic microfibers is about 1:2.

(4) After agitation for an extended time, e.g., circa 40 minutes, to provide uniform dispersion of the components, the dispersion is spread or cast on a foraminous surface and water is removed by free drainage for about 2 seconds followed by the application of a vacuum. The resulting sheet structure is then passed through a dryer at a temperature of from about 220 to 350 degrees F., preferably about 300 degrees F., over about 2 minutes. The resulting flexible, microporous sheet material, i.e., composite structure, in the form of a continuous film-like matrix of the polymer binding agent reinforced by the inorganic microfibers, can then be used in this form, (after treatment to render it hydrophobic and oleophobic) or in the form of multiple layers.

The composite structure may be rendered hydrophobic and oleophobic, as well as resistant to solvents and detergents, by a post-treatment of the formed structure with an appropriate treating agent. Alternatively, as discussed below, the treating agent may be combined with the microfibers and binding agent in the slurry prior to laydown and formation of the sheet material. While simplifying the process of manufacture, it has been found that the post-treatment of the formed composite structure with the surface tension modifying treating agent provides a more desirable structure with enhanced properties of oleophobicity, hydrophobicity, detergent resistance and solvent resistance. Accordingly, the post-treatment technique, as described hereinafter, is preferred.

Herein, the following terms have the meanings as set out below:

Hydrophobic: As used herein, this term refers to the ability to shed water, i.e., the material does not become wetted with water and water does not penetrate the structure of the material. The following test is used to characterize materials used in this invention as being hydrophobic: a square of the material, about five inches on a side, is positioned at a 45 degree angle to the horizontal and 5 drops of water from an eye dropper are dropped onto the surface of the material from a height of about six inches. If the water droplets roll off the surface and do not penetrate or wet the structure, that structure is defined as hydrophobic for purposes of this invention.

Oleophobic: As used herein, this term refers to the ability to shed an oil-based composition, i.e. the material does not become wetted with the oil-based composition nor does it penetrate the structure of the material. The same test as that described above for hydrophobicity, except that 5 drops of mineral oil are substituted for the water drops, is used to characterize material used in this invention as oleophobic. If the mineral oil drops agglomerate but do not wet or penetrate the surface of the structure, the material is defined as oleophobic for purposes of this invention.

Detergent Resistant: As used herein, this term refers to the ability to shed a detergent-based composition, i.e., the material does not become wetted with the detergent-based composition nor does it penetrate the structure of the material. The same test as that described above for oleophobicity, except that 5 drops of a water-based detergent composition, such as Tween 20, a polyoxyethylene sorbitan monolaurate available from Atlas Powder Company, (at a concentration of 20 weight percent in water) are substituted for the mineral oil drops, is used to characterize material used in this invention as detergent resistant. If the detergent collects but does not wet or penetrate the surface of the structure, the material is defined as detergent resistant for purposes of this invention.

Solvent Resistant: As used herein, this term refers to the ability to shed a solvent-based composition, i.e., the material does not become wetted with the solvent-based composition nor does it penetrate the structure of the material. The same test as that described above for oleophobicity, except that 5 drops of a 20 percent solution of isopropyl alcohol in water are substituted for the mineral oil drops, is used to characterize material used in this invention as solvent resistant. If the solvent agglomerates and does not wet or penetrate the surface of the structure, the material is defined as solvent resistant for purposes of this invention.

Another test commonly used to determine the resistance of a structure, such as a fabric, to a test material, such as water, oil, a detergent composition or a solvent, is the "stain" test. In this test, a small amount of the test material (e.g., one or two drops) is placed on the structure (while the structure is held in a horizontal position) and the size of the test material (stain) is measured after a specified time, e.g., 30 seconds. The larger the size of the stain, the less resistant the structure is considered to be to the test material. With the composite structures of the subject invention, not only do the drops of water, mineral oil, detergent composition or solvent not increase in size over 30 seconds, they are capable of being completely blotted up, e.g., with a paper towel, without leaving a stain. With many other air permeable structures that have been treated in an attempt to render them oleophobic, a stain of mineral oil (or other test material used to determine the structure's oleophobicity) is formed which cannot be completely blotted up.

The treating agent used to render the composite structures of this invention oleophobic and hydrophobic as well as to preferably provide detergent and solvent resistance can be any treating agent which imparts the requisite properties as determined by the tests set out above. The preferred fluorochemicals can have varied chemical structures. See for example, U.S. Pat. No. 3,489,148 and the patents cited therein at column 4. Particularly preferred compositions contain perfluorinated fluorochemicals. These type materials are available from Minnesota Mining and Manufacturing Company under the designations FC-807, FC-809 and FC-824. The actives in FC-807 and FC-809 are described in detail in the Federal Register, Volume 37, Number 96, at pages 9762-9763. Specifically, they are liquid based compositions containing as the active solids a minimum of about 40 percent of ammonium bis(N-ethyl-2-perfluoroalkylsulfonamidoethyl) phosphates, wherein the alkyl group is more than 95 percent $C_8$ and the fluorine content is from 50.1 to 52.8 percent by weight. FC-824 is a perfluoroacrylate copolymer. These treating materials are preferably applied in the form of a dilute mixture comprising, e.g., 7 parts by volume of water, 0.5 parts by volume of diethylene glycol monobutyl ether (available from Union Carbide Corporation under the trademark BUTYL CARBITOL®) as a fugitive wetting agent and 2.5 parts by volume of the fluorochemical treating agent (which typically will contain 40 percent by weight solids or more). The 2.5 parts by volume referred to above is based on the total volume of the fluorochemical treating agent, e.g., FC-824, as received from the manufacturer. To prepare the dilute treating mixture, the water and n-butyl alcohol should be premixed and the fluorochemical treating agent slowly added to this first mixture with mixing.

After the composite structure has been treated, e.g., by spraying or roller coating the dilute treating agent onto the structure, it is then dried, preferably at about 250 degrees F.

The film-like composite structures of the subject invention will have calipers in the range of from about 3 to about 20 mils, preferably on the order of 5 mils. They will have porosities or permeabilities of from about 0.01 to about 100 cubic feet of air per square foot of surface area per minute at a pressure of 0.5 inches WC and a temperature of 20° C. They will be oleophobic, as defined above, and resist oil-based aerosols to a minimum of 60 inches WC (approximately 2 psi) and will be hydrophobic, as defined above, to resist water immersion and spray to a minimum of 5 psi.

COMBINATIONS OF THE COMPOSITE STRUCTURE WITH VARIOUS OTHER MATERIALS

The basic composite structure of the subject invention may be used in combination with a variety of other materials which provide enhanced characteristics when the composite structure is used in the fabrication of protective clothing, fabrics, filters and the like. For example, one or more layers of the composite structure of this invention may be laminated to a carbon-containing layer, e.g., a charcoal liner layer, which has the ability to adsorb deleterious gases. The carbon layer for the adsorption of deleterious gases may be in various forms. For example, it may be a carbonized fabric, resin bonded carbon particles on a cloth substrate, resin bonded carbon particles on a porous foam, such as polyurethane or the like. Typically, this type of material loses its effectiveness if wet. Since the composite structure of this invention is hydrophobic, the charcoal liner is desirably protected from moisture as described below.

The composite structures of the subject invention may also be laminated to an outer protective layer of a conventional cloth-like material such as a heavy cotton fabric for wear resistance and to protect the integrity of the composite structure. Alternatively, other fabrics, such as woven nylon, polyester or polypropylene and woven nylon/cotton blends, may be used as the outer protective coating. When the composite structure of this invention is used in combination with a carbon or chemical liner in protective clothing, it may be desirable to protect the carbon liner layer from body perspiration by laminating an abrasion resistant layer of material, such as a non-woven, spun bonded monofilament polyester, to the charcoal liner on the side opposite the composite structure. Alternatively, another layer of the oleophobic, hydrophobic composite structure of this invention may be used as the inner perspiration guard liner to protect the charcoal liner layer from moisture.

Various other combinations may also be used. Also, as noted above, the composite structure can be formed by casting a slurry of the microfibers and the binding agent directly onto a layer of cloth with primed surface treatment, such as degreased, which then becomes an integral part of the structure. When this method is used, the cloth layer on which the composite structure is formed is preferably surface treated with isopropyl alcohol to insure a surface free of grease and the like so that a strong integrated structure is obtained.

The following example illustrates the manner in which the film-like composite structure of the subject invention may be formed, as well as illustrating combination structures having as one component thereof the composite structure of the present invention. The example is illustrative and the invention should not be considered as limited thereby.

A shell or outerwear woven fabric having a basis weight of about 7.5 ounces per square yard comprised of a nylon/cotton mixture was coated with a slurry comprised of glass fibers having diameters in the range of from about 0.4 to about 1.2 micrometers and an equal weight of potassium titanate fibers having diameters in the range of from about 0.2 to about 0.5 micrometer. The slurry also contained about 50 percent by weight of an ethylene/ vinyl acetate copolymer binding agent solids (based on the weight of the fibers), that is, 50 parts by weight of the binding agent solids and 100 parts by weight of the inorganic fibers were present. The method for preparation of the slurry was substantially as described in the preferred method set out above. After extraction of water, the total solids remaining from the slurry was about 5 grams per square foot of 1.6 ounces per square yard, providing a total basis weight for the coated integral structure of about 9.1 ounces per square yard. The resulting composite structure had a caliper of about 0.4 mils and an air permeability at 0.5 inches WC of 0.26 cubic feet per minute per square foot at 20° C. The pore size averaged about 0.5 micron.

This composite was impregnated with a 4 percent solution of the preferred fluorochemical treating agent described above and then cured to produce the hydrophobic and oleophobic structure of the subject invention. The integral structure of this example had a hydrostatic resistance to penetration of 5 psi and was solvent and detergent resistant as measured by the tests set out above.

INDUSTRIAL APPLICABILITY

The film-like composite structures of the subject invention find use in a variety of applications where gas permeable structures having hydrophobic and oleophobic properties are required or may be useful. They find particular application in protective clothing used by individuals working on the clean-up of chemical waste sites, and in protective clothing and field shelters for military personnel who may be exposed to deleterious oil and water-based aerosols. They also find use in filtering applications for removing oil and water-based materials from gases.

For example, the film-like composite structure of the invention may be laminated to a highly porous polyester or polypropylene woven fabric and formed into protective footwear such as shoes or boots. The resulting material is preferably about 50 to 60 mils thick and may be combined with a carbon-containing layer, which has the ability to adsorb deleterious gases. It may also be desirable to laminate an abrasion resistant material, such as a flexible and pliant polyester knit fabric to the carbon-containing layer on the side opposite the composite structure. In this way, a smooth and comfortable layer of material can be placed inside the boot, where it will contact the wearer's skin and tend to reduce discomfort caused by chafing. Such a boot will be flexible and conforming, gas permeable (thereby permitting transmission of air and perspiration through the material from the body side to the atmosphere), hydrophobic, oleophobic and solvent resistant and may be used in connection with the clean-up of chemical waste sites or simply for protection from inclement weather.

The composite structure of this invention may also be useful in combination with various other materials as a cover for aircraft seat cushions and as mattress covers for home and institutional use. In addition to being stain resistant and air permeable for comfort, if a flame resistant binding agent is used to form the composite structure of this invention, such seat cushion and mattress covers will tend to provide a fire barrier from burning materials, such as lighted cigarettes.

I claim:

1. A flexible, microporous, hydrophobic and oleophobic film-like composite structure comprising:
    (1) from about 25 to about 75 parts by weight of inorganic, reinforcing microfibers, (2) from about 75 to about 25 parts by weight of a polymeric binding agent in the form of a continuous matrix, said binding agent being derived from an emulsion or latex of particles of said binding agent having a size of less than about 1 micrometer in a liquid, said binding agent and said microfibers being present in the composite structure in a total amount of 100 parts by weight, based on the weight of said binding agent and said microfibers, and (3) a treating agent present in an amount sufficient to render the composite structure both hydrophobic and oleophobic.

2. The composite structure of claim 1 having a porosity of about 0.01 to about 100 cubic feet of air per square foot of surface area per minute at a pressure of 0.5 inches WC and a temperature of 20° C.

3. The composite structure of claim 2 wherein said inorganic, reinforcing microfibers comprise glass microfibers.

4. The composite structure of claim 2 wherein said inorganic, reinforcing microfibers comprise a mixture of potassium titanate and glass microfibers.

5. The composite structure of claim 2 wherein said polymeric binding agent is a copolymer of ethylene and vinyl acetate.

6. The composite structure of claim 2 wherein said polymeric binding agent is a copolymer of ethylene and vinyl acetate and wherein said copolymer has chlorinated side chains.

7. The composite structure of claim 2 wherein said polymeric binding agent comprises from about 70 to about 30 parts by weight of said composite structure.

8. The composite structure of claim 2 wherein said treating agent comprises a fluorinated hydrocarbon.

9. The composite structure of claim 2 wherein said porosity is in the range of from about 0.1 to about 20.

10. The composite structure of claim 2 wherein said inorganic reinforcing microfibers are glass and have diameters within the range of from about 0.5 to about 2.0 micrometers and aspect ratios of from about 20:1 to about 1,000:1.

11. A water and oil resistant structure comprising: the microporous, hydrophobic, oleophobic film-like composite structure of claim 2 having secured to at least one surface thereof a substrate fabric.

12. The structure of claim 11 wherein said substrate fabric is a polyester, a polyamide, cotton or rayon.

13. The structure of claim 11 wherein said film-like composite structure is integral with said substrate fabric.

14. The structure of claim 13 wherein said substrate fabric is a polyester, a polyamide, cotton or rayon.

15. The structure of claim 11 additionally including a layer of a carbon-containing material with gas adsorption characteristics.

16. The structure of claim 11 additionally including a layer of woven polypropylene laminated to the film-like composite structure.

17. An article of footwear comprising the water and oil resistant structure of claim 16.

18. The structure of claim 16 wherein the polymeric binding agent is fire resistant.

19. An upholstery fabric comprising the water and oil resistant structure of claim 18.

20. A mattress cover comprising the water and oil resistant structure of claim 18.

* * * * *